United States Patent
Mukund et al.

(10) Patent No.: US 6,901,496 B1
(45) Date of Patent: May 31, 2005

(54) LINE RATE BUFFER USING SINGLE PORTED MEMORIES FOR VARIABLE LENGTH PACKETS

(75) Inventors: Shridhar Mukund, San Jose, CA (US); Anjan Mitra, Sunnyvale, CA (US)

(73) Assignee: Adaptec, Inc., Milpitas, CA (US)

(*) Notice: Subject to any disclaimer, the term of this patent is extended or adjusted under 35 U.S.C. 154(b) by 66 days.

(21) Appl. No.: 10/264,580

(22) Filed: Oct. 4, 2002

(51) Int. Cl.[7] .............................................. G06F 12/00
(52) U.S. Cl. ...................................... 711/169; 710/52
(58) Field of Search ....................... 711/169, 5; 710/52; 370/419

(56) References Cited

U.S. PATENT DOCUMENTS

| | | | | |
|---|---|---|---|---|
| 5,926,475 A | * | 7/1999 | Saldinger et al. | ............ 370/394 |
| 6,044,061 A | * | 3/2000 | Aybay et al. | ................ 370/230 |
| 6,072,772 A | * | 6/2000 | Charny et al. | ............... 370/229 |
| 6,195,739 B1 | * | 2/2001 | Wright et al. | .................. 712/19 |
| 6,330,236 B1 | * | 12/2001 | Ofek et al. | .................. 370/369 |
| 2002/0064170 A1 | * | 5/2002 | Siu et al. | ..................... 370/412 |

* cited by examiner

*Primary Examiner*—Christian P. Chace
(74) *Attorney, Agent, or Firm*—Martine Penilla & Gencarella, LLP

(57) ABSTRACT

A network interface card is provided. The network interface card includes a plurality of pipelined processors. Each of the pipelined processors includes an input socket having at least three single ported memory regions configured to store variable-size data packets. The at least three single ported memory regions enable a downstream processor reading the variable-size data packets from the single ported memory regions to maintain a data throughput to support an incoming line rate of a data stream. The line rate data throughput is maintained after a maximum size data packet has been read by the downstream processor. Methods of method for optimizing throughput between a producing processor and a consuming processor and a processor are also provided.

21 Claims, 9 Drawing Sheets

LINE RATE BUFFER USING SINGLE PORTED MEMORIES FOR VARIABLE LENGTH PACKETS

BACKGROUND OF THE INVENTION

1. Field of the Invention

This invention relates generally between two communicating processes, and more particularly to a method and apparatus for line rate throughput for variable size packets being transmitted between microprocessors, while using single ported memories instead of dual ported memories.

2. Description of the Related Art

When multiple processors are in communication with each other, data must be transmitted between the processors. The data is written into memory/buffer by one processor and is read from the memory/buffer by another processor. The data stream consists of a number of packets and when communicating through the Internet, the packet sizes vary. Furthermore, depending on the protocol being used to transmit the data, each packet will have different headers that need to be stripped down by a receiving processor. FIG. 1 is a simplified schematic diagram of a host system configured to receive Ethernet packets. Host 100 includes software stack 102. Software stack 102 includes Internet Small computer System Interface (iSCSI) layer, Transmission Control Protocol (TCP) layer, Internet protocol security (IPSec) layer, and Internet protocol (IP) layer. As is generally known by those in the art, the software stack peels back the headers of a packet to receive the encapsulated data or builds up the packets for eventual transmission over network 108. Network interface card (NIC) 104 includes microprocessor 106 configured to receive and transmit Ethernet packets over network 108.

One of the shortcomings of the design illustrated in FIG. 1 is that a single host processor is responsible for performing the operations associated with software stack 102. Thus, as throughputs are continually being pushed higher, the single processor of the host is limited in the capability of supporting the throughput of the incoming data stream because of the built in latencies associated with the single processor of a host system. That is, the processor of the host can not consistently provide the incoming data to other processors in a manner which limits latencies and at least supports the throughput of an incoming data stream.

FIG. 2 is a schematic diagram illustrating a producer/consumer relationship between two processors. Processor 1 110 is a producer, i.e., processor 1 writes data to single ported memory 112 to be used by processor 2 114. Processor 2 114 is a consumer, i.e., processor 2 reads data 446 from single ported memory 112. Processor 1 110 produces messages which may be configured as a byte or a burst of bytes. Where one processor is talking to another processor, the manner in which data is written into and read from single ported memory 112 impacts the throughput of the system. For example, where a first in-first out (FIFO) method is employed, the producer writes a message into single ported memory 112 and once the message has been completely written into the memory, the consumer reads the message. One skilled in the art will appreciate that the FIFO method can write a single word as a message, i.e., word FIFO, or a contiguous set of words as a message, i.e., message FIFO.

However, the throughput of the producer/consumer relationship must be configured to sustain the line rate. That is, the consumer must be allowed to consume at its maximum line rate so as not to be waiting. One implementation currently being employed to ensure the consumer is operating at its line rate, uses a dual port memory. Dual port memories allow for a consumer to read from memory while a producer is writing to memory, as opposed to a single ported memory, which does not allow for the simultaneous reading and writing from memory. Shortcomings of the dual ported memories include the fact that the dual ported memories are twice as large as single ported memories and as such, take up valuable surface area on a semiconductor chip and consume more power. Additionally, the cost for dual ported memories is expensive relative to single ported memories.

Another implementation being employed to ensure the consumer runs at its line rate, uses two single ported memories, also referred to as ping-pong memories. Here, one memory may be written into while another memory is read from. While the ping-pong memories improve throughput, especially where the packets are all the same size, the ping-pong memories are not able to keep the consumer running at a rate sufficient to maintain an incoming line rate when the packet size of the data packets varies.

In view of the foregoing, there is a need to maintain an incoming line rate for processors in communication with each other when the data being exchanged includes variable packet sizes.

SUMMARY OF THE INVENTION

Broadly speaking, the present invention fills these needs by providing a method and apparatus enabling pipelined processors to maintain an incoming line rate of a data stream. It should be appreciated that the present invention can be implemented in numerous ways, including as a process, an apparatus, a system, or a device. Several inventive embodiments of the present invention are described below.

In one embodiment, a method for enabling line rate throughput of data communicated in a pipeline of processors having single ported memories is provided. The method initiates with providing three single ported memories or buffers in each processor of a pipeline of processors. Then, a plurality of variable-size packets of data associated with a data stream are received. The data stream is associated with a line rate. Next, the variable-size packets of data are distributed to the three single ported memories or buffers of a first processor of the pipeline of processors, wherein one of the plurality of variable-size packets of data distributed to the three single ported memories or buffers is a maximum size packet. Then, the variable-size packets of data are read sequentially. A second processor of the pipeline of processors performs the sequential reading, wherein the second processor maintains the line rate after reading the one of the plurality of variable-size packets of data having the maximum size.

In another embodiment, a method for optimizing throughput between a producing processor and a consuming processor is provided. In this embodiment, the producing processor provides information for the consuming processor. The method initiates with providing at least three single ported memory regions associated with the producing processor. Then, a data stream is received by the producing processor. The data stream includes variable-size data packets. Next, an availability of the at least three single ported memory regions is determined. Then, a received variable-sized data packet is written to an available single ported memory of the producing processor. Upon completion of the writing operation, the variable-sized data packet is read from the available single ported memory. Next, the writing and the reading operations are repeated for successive variable-sized data packets. After reading a memory having a maximum amount of data, a waiting period for the consuming processor between reading each of the successive data packets is eliminated, thereby allowing the consuming processor to maintain an incoming line rate of the data stream.

In yet another embodiment, a network interface card is provided. The network interface card includes a plurality of pipelined processors. Each of the pipelined processors includes an input socket having at least three single ported memory regions configured to store variable-size data packets. The at least three single ported memory regions enable a downstream processor reading the variable-size data packets from the single ported memory regions to maintain a data throughput to support an incoming line rate of a data stream. The line rate data throughput is maintained after a maximum size data packet has been read by the downstream processor.

In still yet another embodiment, a processor is provided. The processor includes an input socket having at least three single ported memory regions configured to receive variable-size data packets. The at least three single ported memory regions enable a downstream processor reading the variable-size data packets to maintain a constant data throughput to support an incoming line rate of a data stream. The data throughput is maintained after a maximum size data packet has been read by the downstream processor. The input socket includes an arbiter configured to distribute the variable size data packets to an available single ported memory of the at least three single ported memories. The arbiter is capable of receiving data packets from multiple sources. The input socket also includes a state machine enabled to identify which of the at least three single ported memories is available to receive data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, find where like reference numerals designate like structural elements.

DETAILED DESCRIPTION OF THE PREFERRED EMBODIMENTS

An invention is described for an apparatus and method for transmitting data between two processors in a manner that maintains line rate throughput. It will be obvious, however, to one skilled in the art, that the present invention may be practiced without some or all of these specific details. In other instances, well known process operations have not been described in detail in order not to unnecessarily obscure the present invention. The term about as used herein refers to a range of +/−10% of the corresponding value.

The embodiments described herein provide an input socket interface for a processor. The input socket interface includes at least three single ported memories/buffers and can receive data from an adapter as well as another processor. The input socket interface steers data available on one of two input ports into one of the at least three memories/buffers. It should be appreciated that two or more input ports can be used as the embodiments described herein are not limited to two input ports. As will be explained in more detail below, the at least three buffers allow for a consuming processor to maintain a line rate after an initial bound latency.

Figure 3:
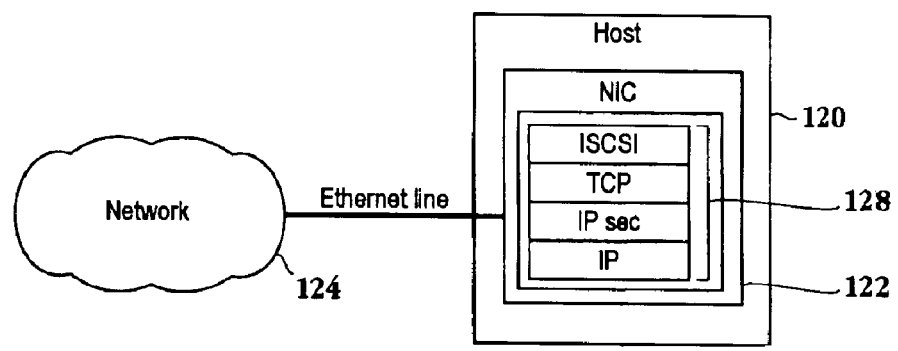
FIG. 3 is a high-level simplified schematic diagram of a network interface card (NIC) having the capability of processing multiple layers of a packet header in accordance with one embodiment of the invention.

FIG. 3 is a high-level simplified schematic diagram of a network interface card (NIC) having the capability of processing multiple layers of a packet header in accordance with one embodiment of the invention. Host 120 includes NIC 122. NIC 122 is in communication with network 124 over an Ethernet line. Software stack 128 includes internet small computer system interface (iSCSI) layer, transmission control protocol (TCP) layer, internet protocol security (IPSec) layer and internet protocol (IP) layer. Here, software stack 128 peels back the headers of a packet received by NIC 122. Alternatively software stack 128 may build the packets for eventual transmission over network 124. It should be appreciated that offloading the encapsulation and stripping processes of the data from host 120 to NIC 122 frees the host for other processing. Furthermore, the pipelined configuration of NIC 122 allows for the encapsulation processes to be broken down into simple steps to process the data efficiently.

Figure 4:
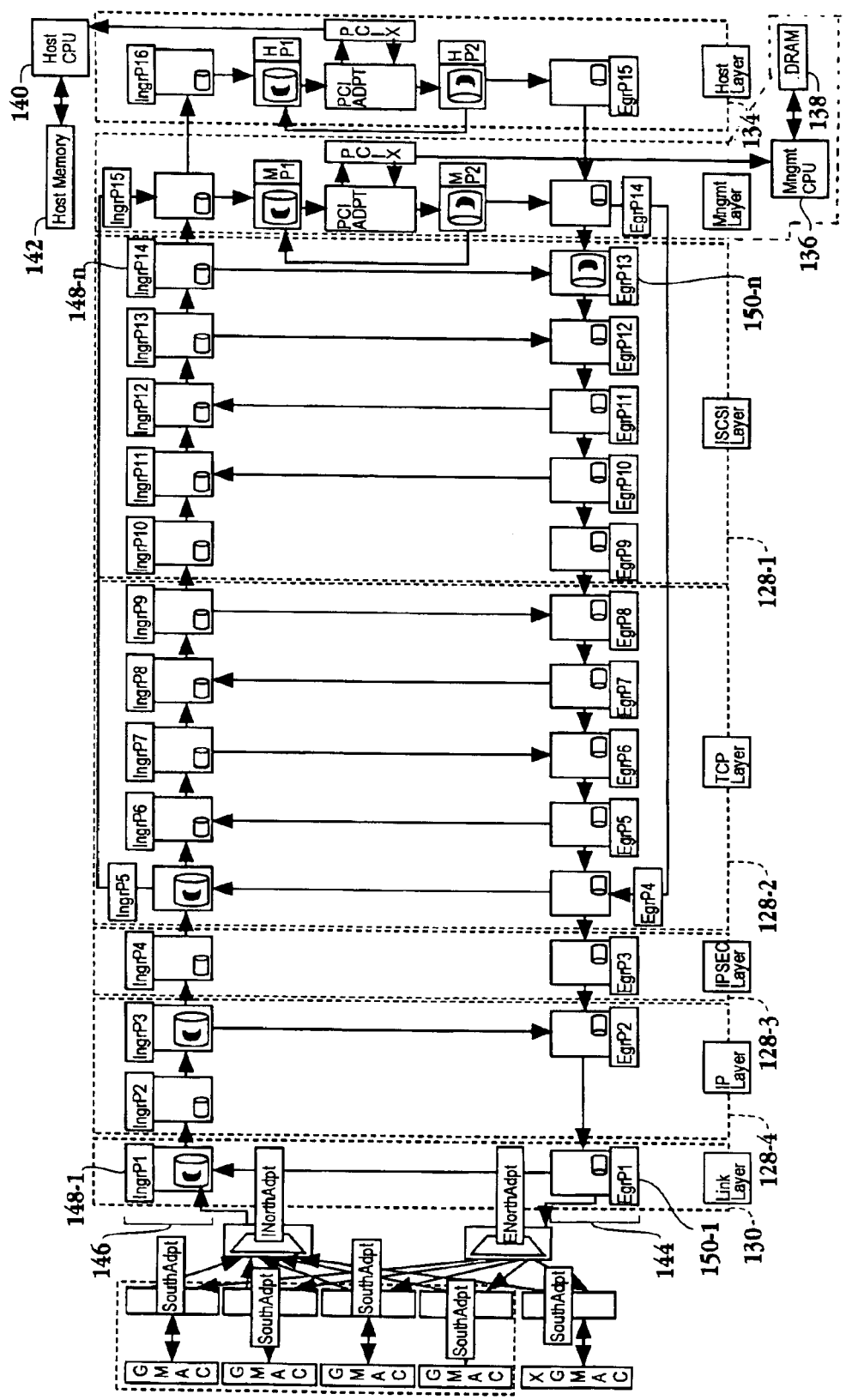
FIG. 4 is a schematic diagram illustrating a configuration of pipelined processors for processing different stages of a received packet in accordance with one embodiment of the invention.

FIG. 4 is a schematic diagram illustrating a configuration of pipelined processors for processing different stages of a received packet in accordance with one embodiment of the invention. As can be seen, each of the layers associated with the software stack, i.e., IP layer 128-4, IPSec layer 128-3, TCP layer 128-2, iSCSI layer 128-1, are defined as distinct stages. Each of the stages includes at least one processor to manipulate the data received from or sent to each of the stages. Processors 148-1 through 148-$n$ make up the processing pipeline for the receiving side 146. Processors 150-1 through 150-$n$ make up the processing pipeline for the transmit side 144. Layers 128-1 through 128-4 are located between link layer 130 and management layer 132. One skilled in the art will appreciate that link layer 130 provides the communication interface for an Ethernet connection, while management layer 132 provides the communication interface for the host layer 134. Management layer 132 includes management central processing unit (CPU) 136, which is in communication with dynamic random access memory (DRAM) 138. Host layer 134 includes a communication interface with host CPU 140. CPU 140 is in communication with host memory 142. In one embodiment, each of the processors 148-1 through 148-n and 150-1 through 150-n contain at least three memory regions in order to maintain a line throughput rate for a data stream being received or transmitted. It should be appreciated that while a certain number of processors is shown in FIG. 4 for each stage, any suitable number of processors can be included in each stage. That is, the number of processors associated with each stage is any suitable number of processors in order to build or strip the data packets for the next processor or next stage. It will be apparent to one skilled in the art that the processors illustrated in FIG. 4 may be located on a printed circuit board and can be configured as a plug-in card. In addition, each of layers 128-1 through 128-4 may be referred to as pipeline stages.

Figure 5:
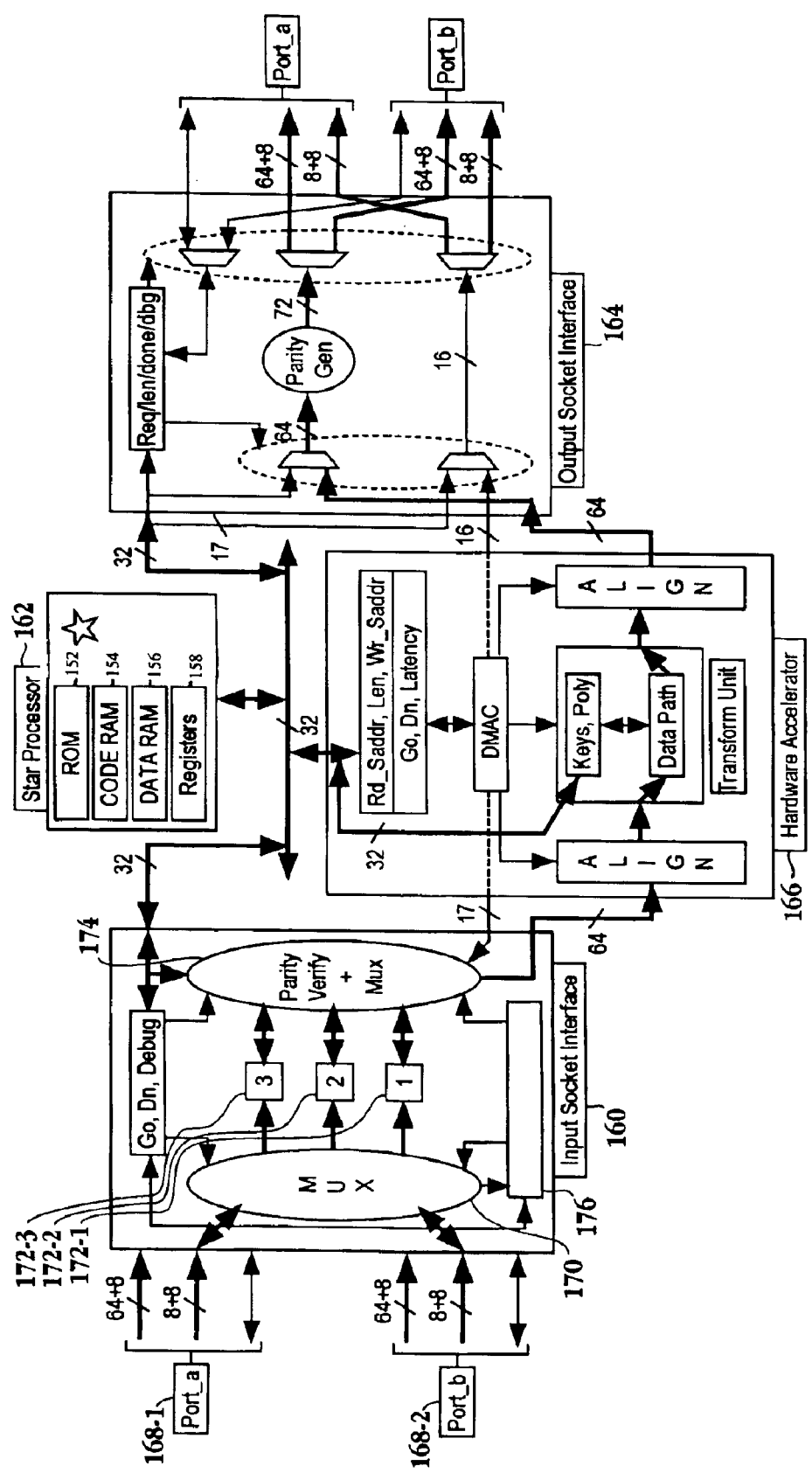
FIG. 5 is a schematic diagram illustrating the modules of the processor complex in accordance with one embodiment of the invention.

FIG. 5 is a schematic diagram illustrating the processor modules of the processor complex in accordance with one embodiment of the invention. Each of the pipelined processors include input socket interface 160, star processor 162, output socket interface 164 and hardware accelerator 166. It should be appreciated that for pipelined processors the output socket interface of a first processor is in communication with an input socket interface of a second processor, and so on for each of the pipelined processors. In one embodiment, input socket interface 160 has two input ports, port A 168-1 and port B 168-2. Each of these ports consists of a 72-bit data bus, a 16-bit address bus (8 bits of address and 8 bits as byte mask) and handshake signals. Data from port A 168-1 and port B 168-2 is communicated to multiplexer 170. In another embodiment, a scheduling algorithm schedules port A and port B requests in a round robin fashion. Multiplexer 170 distributes the packet data into three static random access memory (SRAM) locations. The three SRAM locations are represented by blocks 172-1 through 172-3. In another embodiment, SRAM regions 172-1 through 172-3 are single ported memories. The three single ported memories allow for the throughput rate to be maintained for an incoming data stream, while occupying a minimal amount of area on the chip surface. Each of the memories, also referred to as buffers, 172-1 through 172-3 are in communication with the parity verify and multiplex block 174. It will be apparent to one skilled in the art that the parity verify and multiplex block 174 is a piece of hardware that verifies the parity bits appended to a message. Input socket interface 160 includes finite state machine 176. In one embodiment, when a request is forwarded to finite state machine 176, the finite state machine checks for space availability in the buffers 172-1 through 172-3. Here, a pointer points to the buffer that was last written to and if space is available in the buffer that was last written to, then this buffer is used for writing an incoming packet. In another embodiment, the buffer is used for multiple packets when it is determined that writing multiple packets to a buffer does not cause a delay in a subsequent reading operation.

Input socket interface 160 of FIG. 5, may be configured as a hold-off socket. That is, at times some data may come into the input socket that may need to access a data structure that is not in Data RAM 156 as the capacity of the Data RAM is limited. Thus, the data structure may be stored in external memory, such as dynamic random access memory (DRAM). If the associated data structure is not cached, then it will have to be fetched from the external memory. In order to prevent hold up of all the pipeline processing due to the data fetch, at least three buffers 172-1 through 172-3 are provided. In one embodiment, between 3 and 32 buffers are provided to maintain the line rate of the incoming data.

Figure 1:
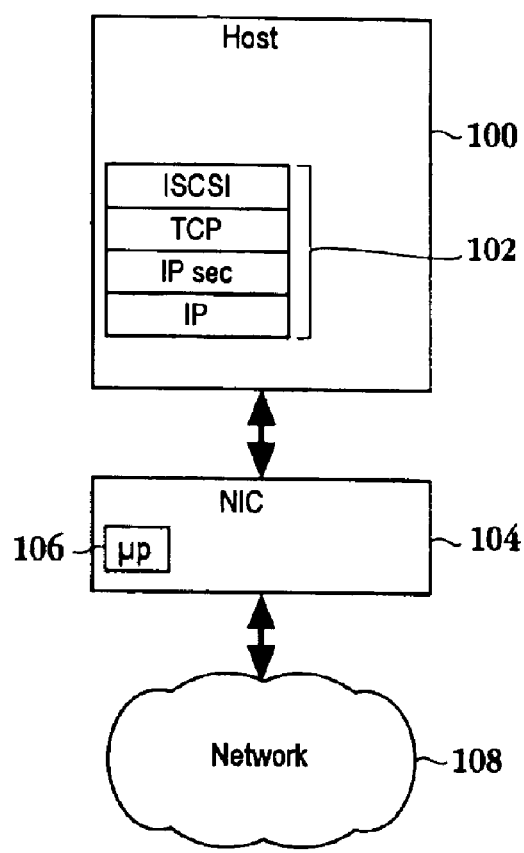
FIG. 1 is a simplified schematic diagram of a host system configured to receive Ethernet packets.
Figure 2:
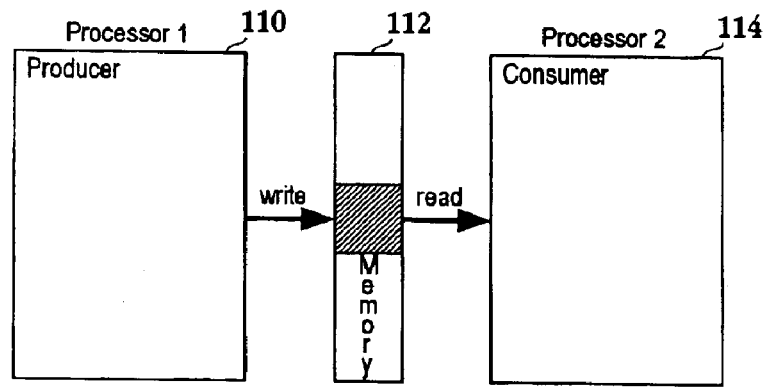
FIG. 2 is a schematic diagram illustrating a producer/consumer relationship between two processors.

Processor 162 includes read only memory (ROM) 152, code random access memory (RAM) 154 data RAM 156 and registers 158. The instruction for the processor to perform its functions is held in the code space, i.e., memory, provided by ROM 152 and code RAM 154. It should be appreciated that by dividing the code space into two parts allows for accommodating fixed code to be used in every stage of the pipeline of processors in one of the parts. Thus, common functions used by each processor of the pipeline are stored in ROM 152, which can be replicated for each processor at each stage. Examples of a common function include instructions for downloading specific microcode for the pipeline stage and moving data between modules. Code RAM 154 contains the specific processing instructions for the functionality performed by the pipeline stage of in which processor 162 is located. For example, processor 162 may perform specific functionality for the IPsec layer or one of the other stages described with reference to FIG. 2. Thus, code RAM 154 would contain the specific processing instructions for the IPsec layer here.

Data RAM 156 enables the processor to access different data structures. For example, a TCP connection behind a TCP packet is associated with a protocol and a data structure. The processor must access the associated data structure to process the TCP packet. Similarly, for the IP layers and the iSCSI layer there will be associated data structures that are fetched and written back from a suitable media or external storage. In one embodiment, registers 158 provide the appropriate addresses in Data RAM 156 to access the appropriate data structures in the Data RAM. In addition, registers 158 provide temporary storage when writing microcode. In another embodiment, after powering-up, code RAM 154 does not have any meaningful data in it. Accordingly, processor 162, upon power-up, will start executing a special system routine from ROM 152 which will initialize the first location of code RAM 154 with a jump statement to the right place in the ROM.

Still referring to FIG. 5, Hardware Accelerator 166, also referred to a as Transform unit, transforms the data. For example, when doing iSCSI processing a data digest or cyclic redundancy check (CRC) must be computed. Here, hardware accelerator 166 performs this function. Additionally, hardware accelerator 166 may perform some align functions. For example, the data packet may start at a certain offset at a first pipeline stage, but when the data is passed to a next pipeline stage it may be desired to start at a different offset, i.e., realign the data. In one embodiment, processor 162 communicates with input socket 160 to determine the data to be communicated to transform unit 166. Subsequently, processor 162 directs transform unit 166 to perform processing as the transform unit moves the data. In addition, processor 162 may instruct transform unit 166 to move data from a first offset to a second offset, as well as specifying a particular transformation process. It should be appreciated that input socket interface 160, processor 162, output socket interface 164 and transform unit 166 are the modules of a processor complex that is replicated for each of the stages of a pipeline architecture, wherein the replicated processor complex can be customized for a particular stage.

Figure 6:
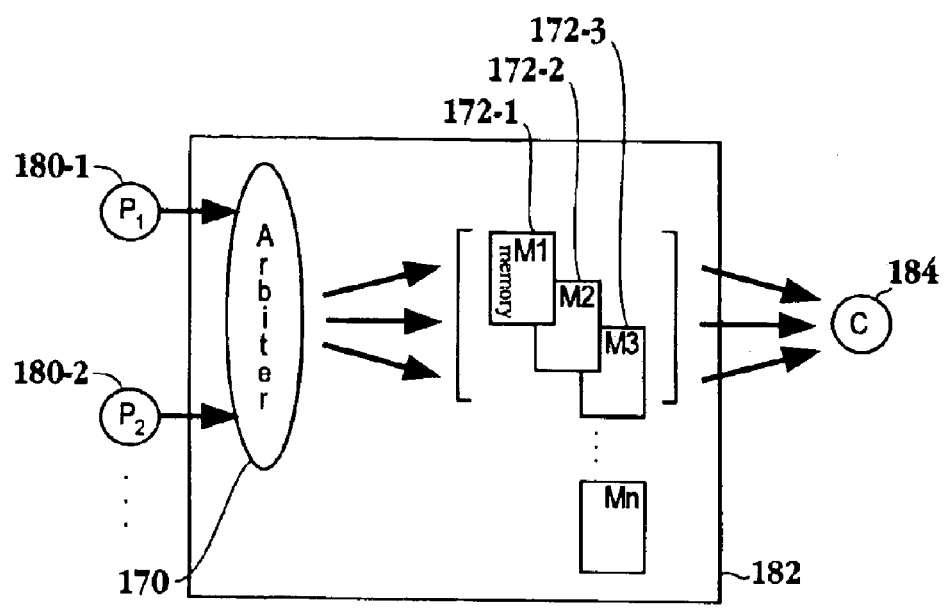
FIG. 6 is an alternative graphical representation of a processor having a plurality of buffers configured to maintain a throughput of a data stream in a producer consumer relationship in accordance with one embodiment of the invention.

FIG. 6 is an alternative graphical representation of a processor 182 having a plurality of buffers configured to maintain a throughput of a data stream in a producer/consumer relationship in accordance with one embodiment of the invention. Producers 1 and 2, 180-1 and 180-2 produce information that is manipulated so that consumer 184 can act upon the information. For example, producers 180-1 and 180-2 may supply data over a distributed network, such as the Internet, to a host system which will consume the data supplied by the producers. It should be appreciated that the pipelined processors of FIG. 4 are arranged in a consumer/producer configuration. As mentioned above, the data is transmitted from an output socket of one processor to an input socket of a next processor in the pipeline. Data from producers 180-1 and 180-2 is communicated to arbiter 170. Arbiter 170 then schedules the delivery of the data packets to the plurality of buffers, i.e., memories 172-1, 172-2, and 172-3. In one embodiment, the size of memories 172-1 through 172-3 is sufficiently large enough to hold the largest data packet. For example, where the largest data packet is approximately 1.5 kilobytes, the memories have a capacity of 2 kilobytes. Arbiter 170 assigns a first data packet to memory 172-1 and a second data packet to memory 172-2. As the data packet is being written into single ported memory 172-2, consumer 184 can read the data packet from single ported memory 172-1. Thus, once consumer 184 completes reading the data in memory 172-1 the consumer will then proceed to memory 172-2, once the data packet assigned to memory 172-2 has been completely written into the memory. The above-described process continues until the entire data stream has been read by consumer 184. While FIG. 6 shows three memory regions, it should be appreciated that any suitable number of memory regions greater than three can be used. However, at least three memory regions are used in order to keep up with bandwidth requirements.

Figure 7:
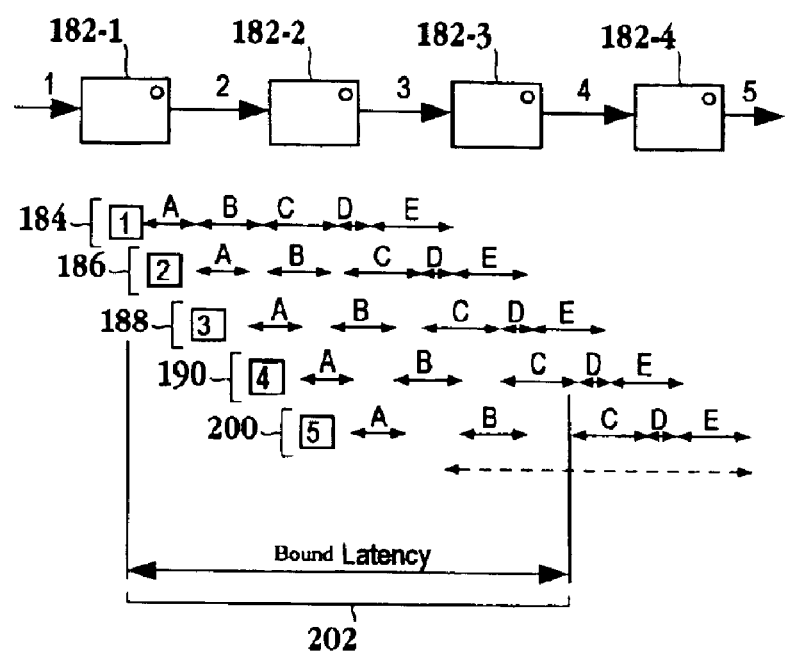
FIG. 7 is a graphical representation of four pipelined processors configured to maintain the throughput of a data stream having variable length data packets in accordance with one embodiment of the invention.

FIG. 7 is a graphical representation of four pipelined processors configured to maintain the throughput of a data stream having variable length data packets in accordance with one embodiment of the invention. The four processors are illustrated by boxes 182-1, 182-2, 182-3 and 1824. A data stream containing five variable length packets is used for illustrative purposes. The variable length packets are represented by line lengths A through E. The input pattern of line 184 represents an incoming data stream of packets A through E which is input to the first processor 182-1. The data stream for the input pattern of line 184 may be transmitted over a distributed network, such as the Internet, to first processor 182-1. Line 186 represents the input pattern to the second processor 182-2. Here, once packet A is completely stored in a memory region of the first processor 182-1, the second processor 182-2 can then access the data of packet A. Here, the second processor reads packet A at the same time that the first processor is writing packet B into a second memory. As packet B is slightly larger than packet A, the time to read packet B into first processor 182-1 is slightly longer than the time for a second processor 182-2 to read packet A. Thus, for the input pattern of line 186 there is a slight delay between the reading of packet A and packet B.

Continuing with the input pattern for the second processor 182-2 of FIG. 7, once packet B has been written into memory of first processor 182-1 second processor 182-2 will read packet B from the memory region. However, there is a slight delay within the input pattern of line 186 between the completion of reading packet B and the initiation of reading packet C. It should be appreciated that the delay results from packet C not being able to be read into second processor 182-2 until packet C is completely written into the memory region of first processor 182-1, as the memories are single ported memories. Upon the completion of reading packet C, future packets D and E and any other packets after packets D and E are read without delay when packet C is a maximum size packet. Thus, there is an initial bound latency. However, after the initial bound latency the throughput is maintained. Accordingly, processors having three or more buffers for storing the variable sized packets as the packets are received, support the throughput of an incoming line rate after the initial bound latency. Input patterns for processor three, line 188 and processor four, line 190 have a similar pattern as discussed above for processors one and two. Line 200 represents the output pattern of processor four. Bound latency 202 represents a latency from the initiation of the receipt of the data stream by first processor 182-1 to a point where the output from fourth processor 182-4 is maintained at a rate supporting the incoming line rate. It should be appreciated that the maximum latency at each stage of the pipeline is not more than one maximum packet length. For example, the latency between each of the input patterns 184 to 200 is represented by the packet length of packet A. The total maximum latency is equal to the number of processors in the pipeline times the maximum packet length.

Figure 8A:
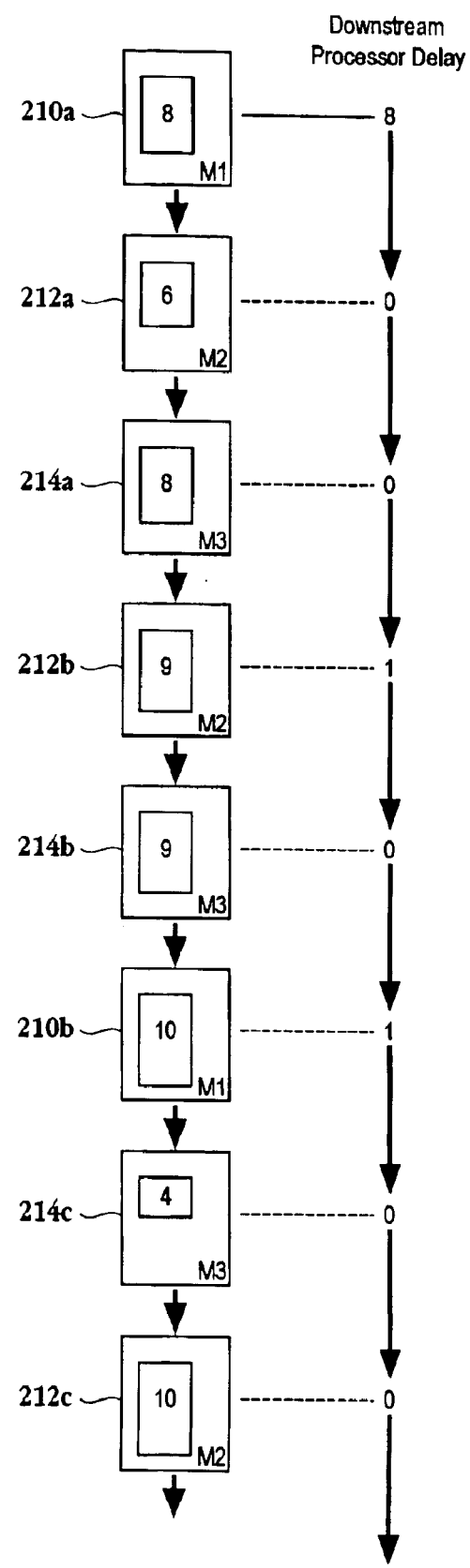
FIG. 8A is a schematic diagram pictorially illustrating a manner in which a processor having at least three single ported memories, maintains a throughput of an incoming data stream after a bound latency in accordance with one embodiment of the invention.

FIG. 8A is a schematic diagram pictorially illustrating a manner in which a processor having at least three single ported memories, maintains a throughput of an incoming data stream after a bound latency in accordance with one embodiment of the invention. Here, three single ported memories (depicted as M1, M2 and M3) are available for the storage of data packets being received by a first processor. The data packets are of a variable size. Thus, as the packets are received by the first processor, the packets are distributed to each of the memories. In one embodiment, the processor includes between 3 and 32 memories. In another embodiment, the maximum packet size is about 1.5 kilobytes and the capacity of the memories is about 2 kilobytes. It should be appreciated that the memory size can be any suitable size sufficient to store a maximum size data packet.

Following the example set forth in FIG. 8A, memory M1 210a initially receives a data packet having a relative size of 8. For exemplary purposes the relative sizes of the data packets are depicted as an integer between one and ten, with a one representing the smallest size data packet and a ten representing the maximum size data packet. Thus, initially a data size packet having a relative size of 8 is written into memory M1 210a. As soon as the data packet is completely written into memory M1 210a, a downstream processor reads the data packet from memory 210a. Accordingly, the downstream processor is idle during the writing of the 8-size packet into memory 210a, i.e., there is a delay corresponding to the writing of the packet into memory 210a as the downstream processor must wait until the packet is completely written into the single ported memory. Once the first packet is written into M1, a second packet is written into M2 212a. As indicated, the second packet has a relative size of 6. It should be appreciated that the reading and writing operations take approximately the same amount of time, therefore, no delay exists when writing the second packet into memory 212a. That is, the downstream processor takes longer to read the packet in memory M1 210a having a relative size of 8, than the writing process for the packet having a relative size of 6 into memory M2 212a. Once the write operation for the packet having a relative size of 6 is completed, the next packet, which has a relative size of 8, is written into memory M3 214a. It should be appreciated that the above described process would not work with less than three single ported memories, as the bandwidth would be inadequate. For example, while the downstream processor is reading memory M1 210a and a packet is written into memory M2 212a, a third packet could not be written into memory upon the completion of writing the second packet into memory. Thus, two single ported memories would be inadequate in this instance.

Continuing with FIG. 8A, once the third packet is written into memory M3 214a a fourth packet is written into memory M2 212b. As shown, the downstream processor reads memory M3 214a without delay, i.e., as soon as the processor has completed reading memory M2 212a. It should be appreciated that FIG. 8A is not meant to limit the embodiments of the invention to a particular order of writing into available memories, as any order would suffice here as long as the memory is available. A memory is available if there exists sufficient capacity to hold the packet and if writing the packet to an alternate memory would not decrease a waiting period for the downstream processor. The fourth packet has a relative size of 9, therefore, the downstream processor will have to wait for a 1 block time period after the downstream processor completes reading memory M3 214a. Following the same line of reasoning, the fifth packet having a relative size of 9 is written into memory M3 214b and the downstream processor does not experience any delay when reading the fifth packet. The sixth packet is a maximum size packet having a relative size of 10 and is written into memory M1 210b. Here, the downstream processor will have to wait for a 1 block time period after the downstream processor completes reading memory M3 214b, because the writing process for the maximum size packet is not complete when the downstream processor is ready to read the sixth packet. Once the downstream processor has read the sixth packet, all future packets are read by the downstream processor without delay. In essence, a large enough cushion is built between the writing operation and the reading operation once a full size packet is written to a memory/buffer space so that a downstream processor maintains a line rate of the incoming data stream. That is, after a full size packet has been received, the downstream processor, also referred to as a consuming processor, is continuously supplied with data packets as long as data packets are being written to memory. It should also be noted here that at any given point of time the maximum latency incurred in every processor is equal to serving the maximum size packet until that point of time.

Figure 8B:
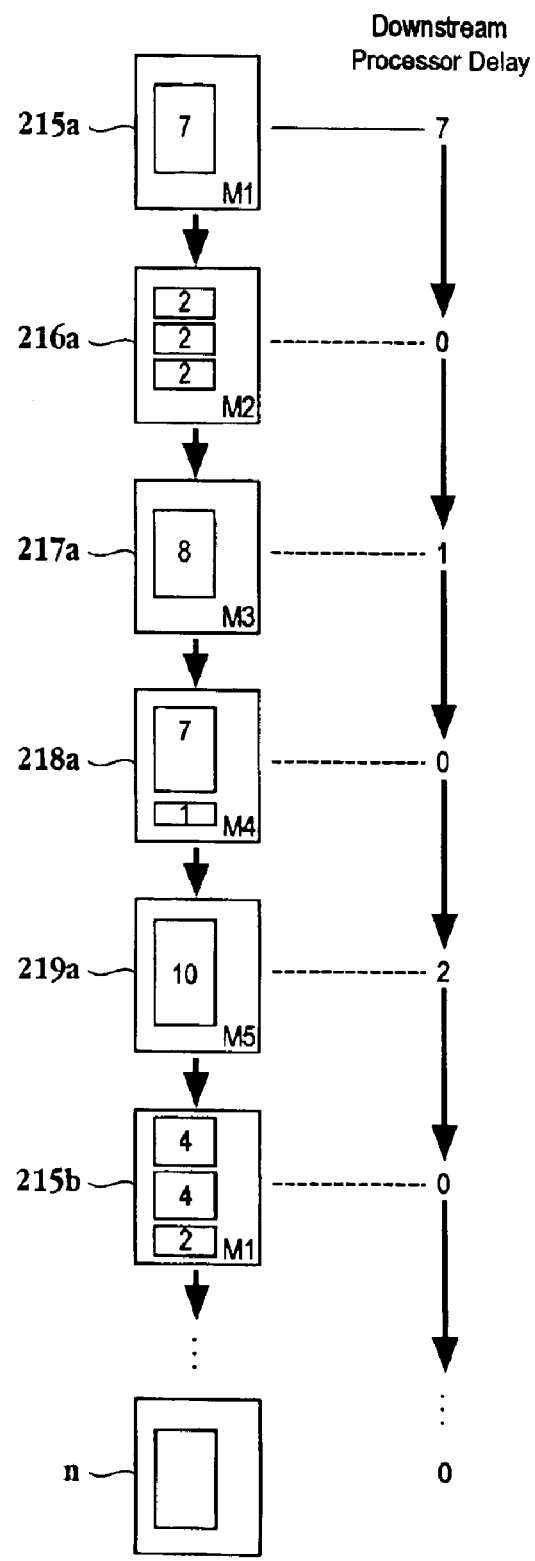
FIG. 8B is a schematic diagram pictorially illustrating a manner in which a processor, having at least three single ported memories, maintains a throughput of an incoming data stream similarly to FIG. 8A.

FIG. 8B is a schematic diagram pictorially illustrating a manner in which a processor, having at least three single ported memories, maintains a throughput of an incoming data stream similarly to FIG. 8A. Here, the processor includes five memory regions M1–M5. As mentioned above, the processors of the pipeline, such as the pipeline illustrated with reference to FIG. 4, can have any suitable number of memory regions greater than three. Anything more than 3 buffers is only required if there is a need to hold some messages or data packets temporarily in those buffers. In FIG. 8B, data packets 1–5 are written to memories M1–M5 215a–219a sequentially. Similar to the process described above with respect to FIG. 8A, once packet one is written to M1 215a, a downstream processor reads the packet from M1. As indicated, the first packet has a relative packet size of 7, therefore, the downstream processor waits for a period of time corresponding to writing a packet size of 7. Once the packet has been completely written to M1 215a, the downstream processor begins reading the packet data. Successive packets transmitted to the upstream processor are written into memories M1–M5 as described with reference to FIG. 8A. It should be appreciated that the difference between FIGS. 8A and 8B are the packet sizes and the number of memories. In one embodiment, a distributor of the incoming packets to the respective memories may place more than one packet in a memory. For example, 3 data packets each having a relative packet size of 2 are written into memory M2 216a. As the downstream processor has to read a first packet having a relative size of 7 in memory M1 215a initially, the downstream processor will not complete reading the first packet prior to the next three packets being written into memory M2 216a. In one embodiment, the finite state machine discussed with reference to FIG. 5 determines the scheduling of the packets to be written into a memory/buffer space. Accordingly, the scheduling algorithm considers the amount of space in memory and whether writing an additional packet to a memory/buffer space occupied by an unread packet will delay the reading process. Even where there may be space available, the packet will not be written to the memory if the reading process will be delayed. Memory M4 218a also has multiple packets stored in a single memory region without causing a delay in the downstream reading process. As mentioned above with reference to FIGS. 5 and 6, the distributor is a multiplexer in one embodiment.

Continuing with FIG. 8B, a maximum size packet is first written into memory M5 219a. As discussed above with reference to FIG. 8A, the downstream processor is supplied with a continuous stream of data packets in order to maintain an incoming line rate after reading the maximum size packet. That is, the downstream processor does not experience any delays associated with waiting for data to be written into a memory. It should be appreciated that while the maximum size packet of FIGS. 8A and 8B is illustrated as one packet, the maximum size packet may include two or more packets having a size less than maximum size packet, wherein the combined packet size of the two or more packets is equal to a maximum size packet. For example, the packet read into memory M1 215b of FIG. 8B, that follows the maximum size packet of memory M5 219a is composed of three smaller packets having packet sizes of 4, 4, and 2, which combines to be a maximum size packet.

Figure 9:
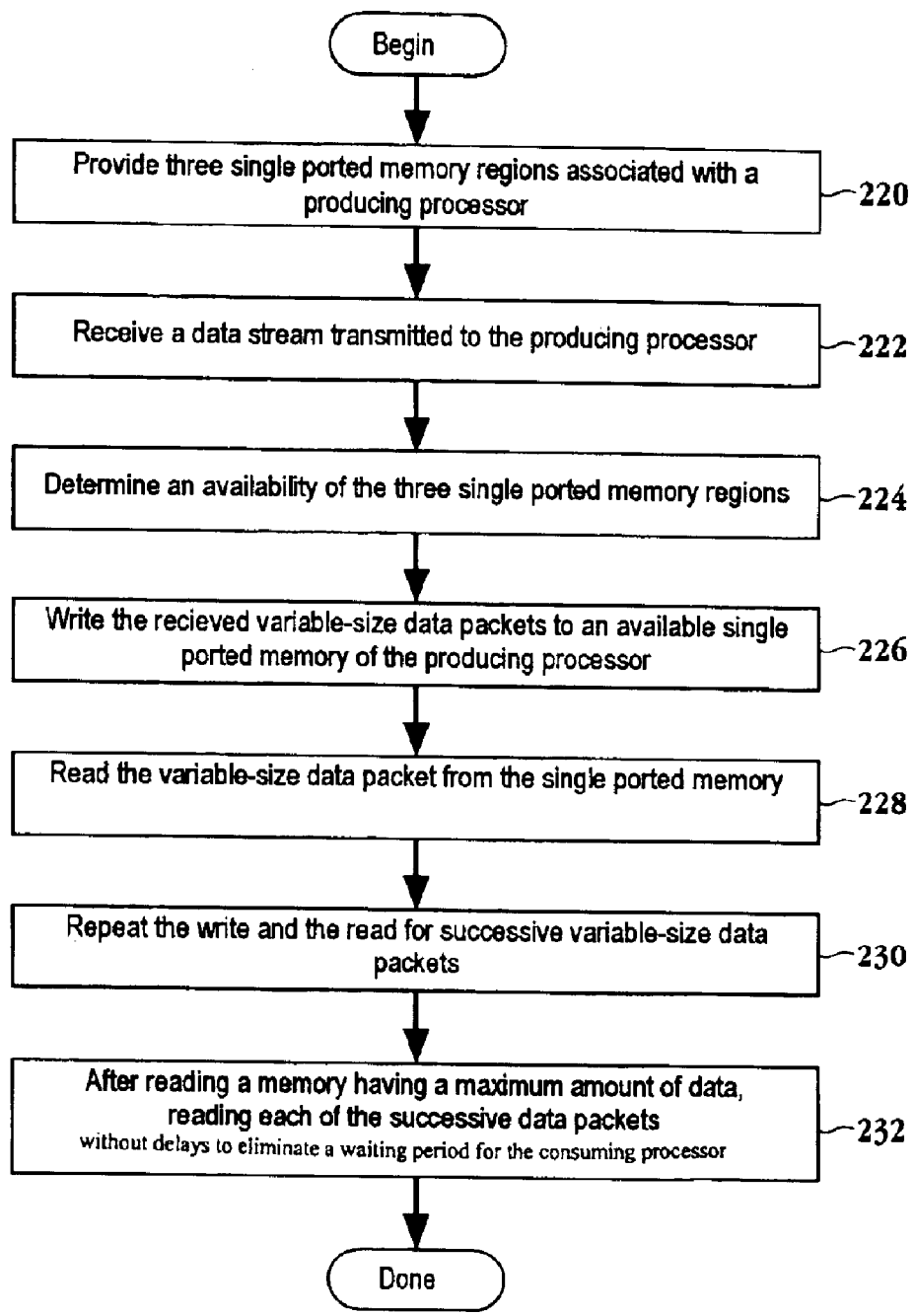
FIG. 9 is a flowchart diagram of the method operations for optimizing throughput between two processors in accordance with one embodiment of the invention.

FIG. 9 is a flowchart diagram of the method operations for optimizing throughput between two processors in accordance with one embodiment of the invention. The method initiates with operation 220 where three single ported memory regions associated with a producing processor are provided. In one embodiment the single ported memory regions have a capacity of about 2 kilobytes. In another embodiment, the single ported memory regions have a capacity sufficient to hold a maximum size data packet. In yet another embodiment, the producing processor is one of a plurality of processors in a pipeline. For example, the processor pipeline may be configured as illustrated in FIG. 4. The method then advances to operation 222 where a data stream transmitted to the producing processor is received. Here, the data stream includes variable-size data packets. In one embodiment, a maximum-size data packet is about 1.5 kilobytes in size. In another embodiment, the data stream is received by a multiplexer configured to distribute the received data packets to an available buffer, i.e., memory region.

Still referring to FIG. 9, the method then moves to operation 224 where an availability of the three single ported memory regions is determined. In one embodiment, the allocation of the single ported memory regions is controlled by a finite state machine. For example, the finite state machine asserts a grant if there is a buffer or buffer space available. If a buffer or buffer space is not available, the finite state machine waits until the space is available, i.e., the data is read by a down stream processor. The method then moves to operation 226 where the received variable-size data packets are written to an available single ported memory of the producing processor. In one embodiment, the variable-size data packets are written to an available buffer or a buffer space as discussed with reference to FIGS. 8A and 8B. The method then advances to operation 228 where upon completion of the write operation, the variable size data packet is read from the single ported memory. In one embodiment, a consuming processor, such as a downstream processor of a processor pipeline reads the data.

The method of FIG. 9 then proceeds to operation 230 where the write and read operations are repeated for successive variable-size data packets of an incoming data stream. The write and read operations are repeated as discussed with reference to FIGS. 8A and 8B. The method then moves to operation 232, where after reading a memory having a maximum amount of data, the consuming processor reads successive data packets without delays, such as delays related to waiting for data to be written into the single ported memories, so that a waiting period for the consuming processor between successive read operations is eliminated. Consequently, the consuming processor is reading the data packets at a rate that maintains an incoming line rate of the data stream. It should be appreciated that a minimum of three buffers is needed for each processor to keep up with bandwidth requirements.

In summary, the embodiments of the present invention provide an input socket configured to steer input data available on one of two input ports, or more, into one of at least three buffers. In one embodiment, the two input ports are serviced in a round robin fashion. A finite state machine controls buffer allocation and read/write operations. In another embodiment, the memory regions are SRAMs.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling line rate throughput of data communicated in a pipeline of processors having single ported memories, comprising:

providing three single ported memories in each processor of a pipeline of processors;

receiving a plurality of variable-size packets of data associated with a data stream, the data stream associated with a line rate;

distributing the variable-size packets of data to the three single ported memories of a first processor of the pipeline of processors, wherein one of the plurality of variable-size packets of data distributed to the three single ported memories of the first processor is a maximum size packet; and sequentially reading the variable-size packets of data, the reading performed by a second processor of the pipeline of processors, wherein the second processor maintains the line rate after reading the one-of the plurality of variable size packets of data having the maximum size.

2. The method of claim 1, wherein the three single ported memories are static random access memories.

3. The method of claim 1, wherein distributing the variable-size packets of data to the three memories of a first processor of the pipeline of processors includes, determining an availability of the three single ported memories of the first processor; and assigning multiple variable size data packets to one of the three single ported memories of the first processor without delaying a subsequent reading operation of the variable size data packets.

4. The method of claim 1, wherein the maximum size packet is 1.5 kilobytes.

5. The method of claim 1, wherein the pipeline of processors is located on a network interface card.

6. A method for optimizing throughput between a producing processor and a consuming processor, the producing processor providing information for the consuming processor, the method comprising:

providing at least three single ported memory regions in the producing processor;

receiving into the producing processor a data stream, the data stream having variable-size data packets;

determining an availability of the at least three single ported memory regions;

writing a received variable-size data packet to an available single ported memory region of the producing processor;

upon completion of the writing, reading the received variable-size data packet from the available single ported memory region;

repeating the writing and the reading for successive variable-size data packets; and after reading one of the single ported memory regions having a maximum amount of data, maintaining a line rate after reading one-of the successive variable size packets of data having a maximum size.

7. The method of claim 6, wherein a finite state machine determines the availability of the at least three single ported memory regions.

8. The method of claim 6, wherein the producing processor and the consuming processor are processors included in a pipeline of processors.

9. The method of claim 8, wherein the pipeline of processors is configured to manipulate header data for the variable size data packet.

10. The method of claim 6, further including:

providing a pipeline of processors on a network interface card (NIC) in communication with a host central processing unit, the pipeline of processors including the consuming processor and the producing processor; and executing encapsulation of the variable size data packets through the pipeline of processors.

11. The method of claim 6, wherein a waiting period is caused when the producing processor fails to supply the consuming processor with at least one variable-size data packet capable of being read when the consuming processor completes reading another variable size data packet.

12. The method of claim 6, wherein determining an availability of the at least three single ported memory regions includes:

assigning multiple variable size data packets to one of the at least three single ported memory regions without delaying a subsequent reading operation of the variable size data packets.

13. The method of claim 6, wherein the at least three single ported memories are static random access memories.

14. A network interface card, comprising:

a plurality of pipelined processors, each of the plurality of pipelined processors including, an input socket interface having at least three single ported memory regions configured to store variable-size data packets, the at least three single ported memory regions enabling a downstream processor reading the variable-size data packets from the single ported memory regions to maintain a line rate data throughput to support an incoming line rate of data stream, the line rate data throughput being maintained after a maximum size data packet has been read by the downstream processor.

15. The network interface card of claim 14, wherein each of the plurality of pipelined processors further includes:

an output socket interface for transmitting data to a downstream processor.

16. The network interface card of claim 14, wherein the plurality of pipelined processors are apportioned to perform tasks associated with protocol layers.

17. The network interface card of claim 16, wherein the protocol layers are selected from the group consisting of internet small computer system interface (iSCSI) layer, transmission control protocol (TCP) layer, internet protocol security (iPSec) layer and internet protocol (IP) layer.

18. A processor, comprising:

an input socket interface having at least three single ported memory regions configured to receive variable-size data packets, the at least three single ported memory regions enabling a downstream processor reading the variable-size data packets to maintain a constant data throughput to support an incoming line rate of a data stream, the constant data throughput being maintained after a maximum size data packet has been read by the downstream processor, the input socket interface including, an arbiter configured to distribute the variable size data packets to the at least three single ported memory regions, the arbiter capable of receiving data packets from multiple sources; and a state machine enabled to identify which of the at least three single ported memory regions is available to receive data.

19. The processor of claim 18, wherein the at least three single ported memory regions are static random access memory regions.

20. The processor of claim 18, wherein the state machine is capable of assigning at least one of the variable-size data packets to one of the at least three single ported memory regions.

21. The processor of claim 18, wherein the maximum size data packet is 1.5 kilobytes.

* * * * *